UNITED STATES PATENT OFFICE 2,416,613

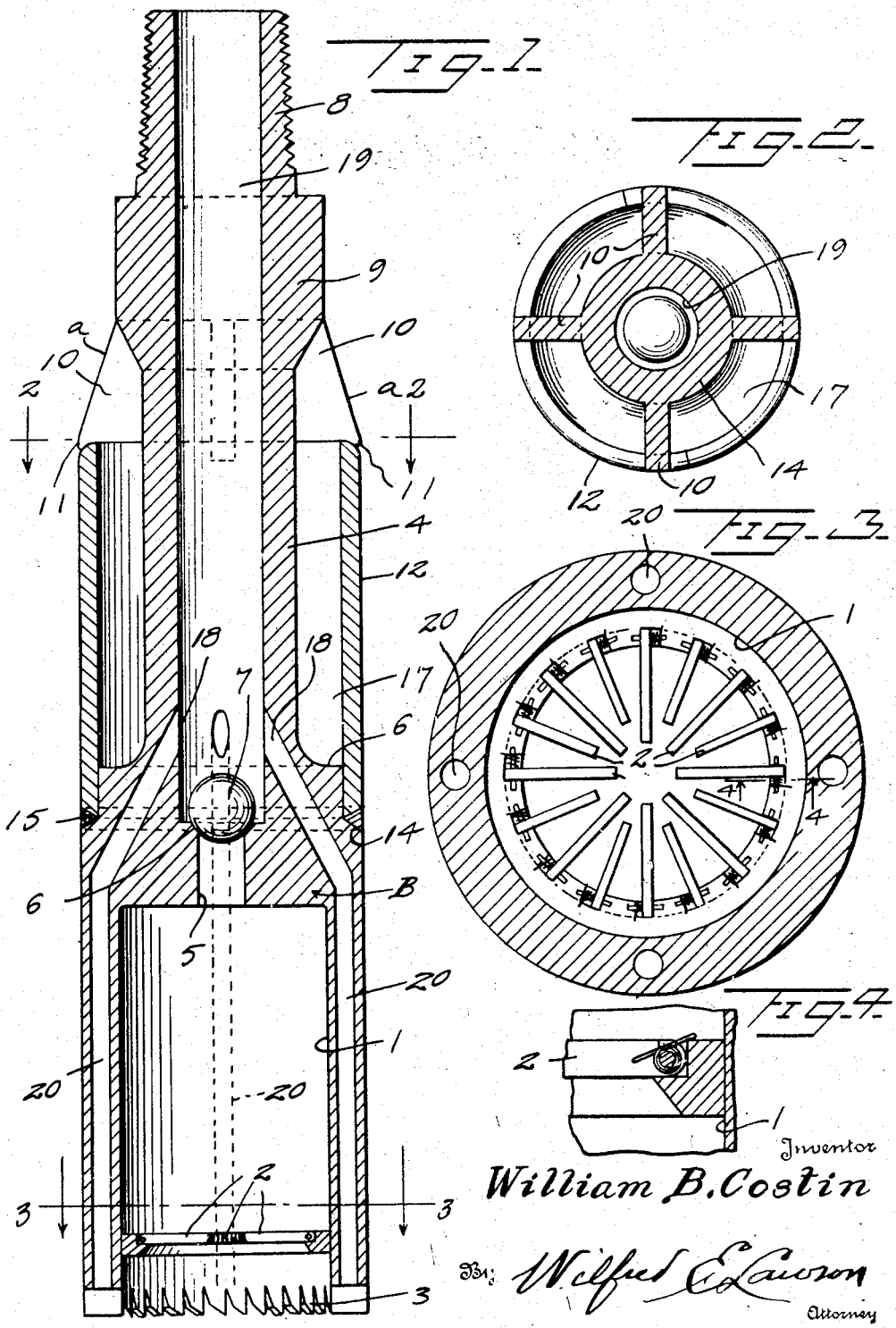
Feb. 25, 1947.  W. B. COSTIN  2,416,613
FISHING TOOL FOR DEEP WELLS
Filed Feb. 7, 1945
Inventor
William B. Costin

FISHING TOOL FOR DEEP WELLS

William B. Costin, Monahans, Tex.

Application February 7, 1945, Serial No. 576,580

1 Claim. (Cl. 294—86)

This invention relates to a fishing tool for deep wells and it is an object of the invention to provide a device of this kind which may be employed to advantage in removing bearings and junk.

It is also an object of the invention to provide a device of this kind constructed in a manner to provide an upper basket to hold bearings and junk of relatively small sizes, together with a lower or bottom basket for catching cones or other relatively large articles.

The invention consists in the details of construction and in the combination and arrangement of the several parts of my improved fishing tool for deep wells whereby certain important advantages are attained, as will be hereinafter more fully set forth.

In order that my invention may be the better understood, I will now proceed to describe the same with reference to the accompanying drawings, wherein:

Figure 1 is a longitudinal sectional view taken through a tool constructed in accordance with an embodiment of the invention;

Figure 2 is a sectional view taken substantially on the line 2—2 of Figure 1; and Figure 3 is a sectional view taken substantially on the line 3—3 of Figure 1.

Figure 4 is an enlarged fragmentary view taken substantially on the line 4—4 of Figure 3.

As disclosed in the accompanying drawings, the fishing tool comprises a cylindrical member B of desired dimensions and which is provided with a downwardly facing and relatively deep pocket or basket 1 open at the bottom of the body member B and which pocket or basket 1 is adapted to receive cones or other relatively large objects within a deep well and be retained therein by the catches 2 whereby such cones or the like can be readily recovered.

The bottom edge of the body member B defining the open end of the pocket or basket 1 is formed to provide the middle teeth 3 to facilitate the action of the tool in a manner and for a purpose which is believed to be clearly apparent to those skilled in deep well operations.

The upper end of the body member B at its axial center is continued by a relatively long tubular stem 4 in communication with the pocket or basket 1 at the top thereof through the port 5. The upper portion of this port 5 is formed to provide a surrounding seat 6 upon which is adapted to be seated, upon being dropped into the stem 4, a valve member 7 herein disclosed as a ball of requisite dimensions and weight.

The upper or outer end portion of the stem 4 is suitably formed, as at 8, for coupling with a conventional drill line.

The upper portion 9 of the stem 4 and immediately below and adjacent to the coupling means 8 is enlarged to provide a surrounding head and immediately below this head the stem 4 has extending outwardly therefrom the equidistantly and circumferentially spaced wings or lugs 10, the outer edges a of which are outwardly and downwardly inclined, whereby the wings or lugs 10 provide effective means to prevent the tool from hanging on pipes or ledges which would otherwise interfere with the desired removal of the tool.

The outer lower portion of the wings or lugs 10 are downwardly disposed, as at 11, to provide depending fingers with which are engaged from below the upper portion of a sleeve 12 which surrounds the inner portion of the stem 4 and is interposed between the outer portions of the wings or lugs 10 and a shoulder 14 provided at the upper part of the body member B. The sleeve 12 is held in place by welding, as at 15, or otherwise as may be preferred.

The portion 16 of the body member B above the shoulder 14 is slightly reduced and with which reduced portion the lower extremity of the sleeve 12 is snugly engaged, whereby the sleeve 12 is maintained effectively in applied position.

As is clearly illustrated in the accompanying drawings, the sleeve 12 is spaced from the stem 4 whereby is provided a basket 17 open at its top and to which access is had in the spaces between adjacent wings or lugs 10. It is also to be noted that the inner face of the applied sleeve 12 is outwardly of the periphery of the head 9 whereby is facilitated collection between the basket 17 of the bearings, junk and other relatively small bodies.

In communication, as at 18, with the bore 19 of the stem 4 at desired points above the valve seat 6 are the inner ends of the circulating passageways or water courses 20 which are extended through the body member B outwardly of the pocket or basket 1 and opening through the bottom edge face of the body member B. These passageways or courses 20 are preferably four in number and equidistantly spaced around the body member B although the number and location may be varied if desired.

The valve member 7 controls the flow or circulation of the water through the tool. After the bearings, junk and kindred matter have been collected in the upper basket 17, the valve member 7 is dropped through the tool to engage its seat 6 which closes flow through the port 5 and causes the flow to be through the passageways or courses 20. With the flow closed through the port 5, the bucket or basket 1 can then be employed to advantage to pick up cones or the like which may be within the well.

What is claimed is:

A fishing tool for deep wells, comprising a relatively long body having a pocket formed in and opening through one end of the body, the said one end constituting the lower end of the tool when in use, said pocket providing means for receiving a body from the bottom of a well, retaining catches carried by the lower portion of the body within the pocket and extending radially toward the center thereof, a reduced stem extending upwardly from the top of the pocketed body upon the axial center thereof and formed at its free end to provide a coupling means for connecting the tool in a well pipe line, a sleeve mounted upon the upper end of the body and partially surrounding the stem, said sleeve being open at its top and spaced from the stem to provide a material receiving basket, the stem above the sleeve being provided with outstanding wings having their outer edges downwardly and outwardly directed, the upper end portion of the sleeve being directly engaged with the lower edges of the wings, the outer portions of the wings having parts overlying the upper portions of the sleeve, the lower end portion of the sleeve being permanently joined with the upper portion of the body.

WILLIAM B. COSTIN.

REFERENCES CITED

The following references are of record in the file of this patent:

UNITED STATES PATENTS

| Number | Name | Date |
|---|---|---|
| 2,090,616 | Erwin | Aug. 24, 1937 |
| 2,096,056 | Miller | Oct. 19, 1937 |
| 2,159,249 | Brantly | May 23, 1939 |